United States Patent

Kress et al.

Patent Number: 5,211,516
Date of Patent: May 18, 1993

[54] CUTTING TOOL

[75] Inventors: Dieter Kress, Aalen; Friedrich Häberle, Lauchheim, both, Fed. Rep. of Germany

[73] Assignee: MAPAL Fabrik fur Prazisionswerkzeuge Dr. Kress KG, Aalen, Fed. Rep. of Germany

[21] Appl. No.: 780,250

[22] Filed: Oct. 22, 1991

[30] Foreign Application Priority Data

Oct. 29, 1990 [DE] Fed. Rep. of Germany ....... 4034345

[51] Int. Cl.⁵ .......... B23B 29/08; B23B 51/00
[52] U.S. Cl. ...................... 408/231; 407/41; 407/49; 407/108; 408/713
[58] Field of Search ...... 407/41, 49, 108, 44, 407/45, 36-39, 77, 47, 50, 102, 107-112, 33, 34, 92; 408/231, 232, 713, 199, 227, 197; 175/420.1, 420.2, 426, 432

[56] References Cited

U.S. PATENT DOCUMENTS

| | | | |
|---|---|---|---|
| 2,134,140 | 10/1938 | Miller | 407/45 |
| 2,382,510 | 8/1945 | Seiter | 407/37 X |
| 4,125,342 | 11/1978 | Fress | 408/185 X |
| 4,954,024 | 9/1990 | Kress et al. | 408/713 X |

FOREIGN PATENT DOCUMENTS

89/11367 11/1989 PCT Int'l Appl. ............... 407/102

Primary Examiner—Steven C. Bishop
Attorney, Agent, or Firm—Anderson, Kill, Olick & Oshinsky

[57] ABSTRACT

A cutting tool for expanding or opening up the diameter of boreholes includes at least one reversible knife plate with a front surface. The knife plate can be clamped with at least one clamping shoe into a recess provided in a cutter head. The front surface of the knife plate has at least two grooves which extend essentially parallel and preferably symmetrical with respect to the longitudinal axis of the knife plate. The grooves cooperate with projections provided on the contact surface of the clamping shoe facing the front surface of the knife plate and form a positively locked connection therewith.

18 Claims, 2 Drawing Sheets

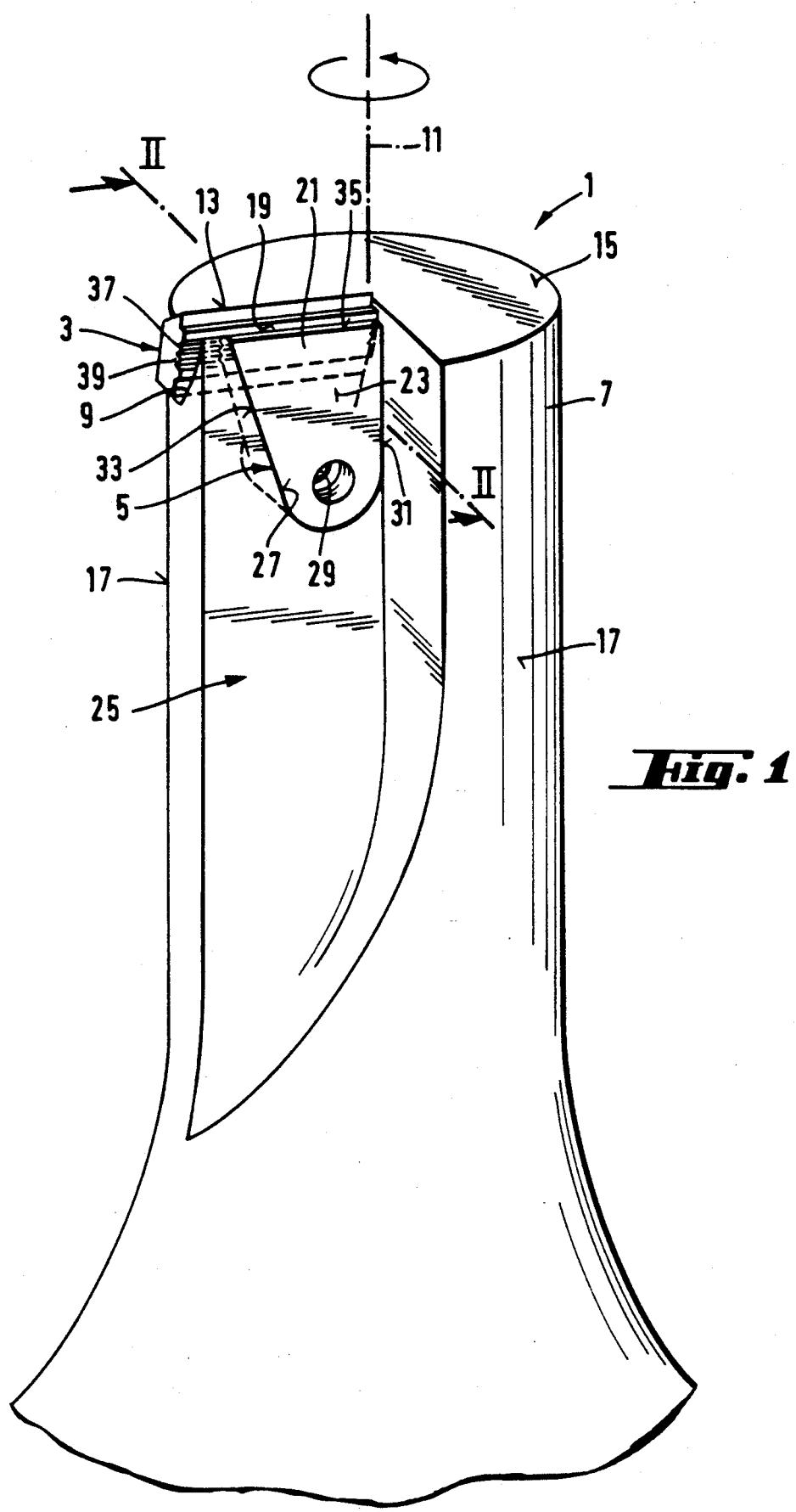

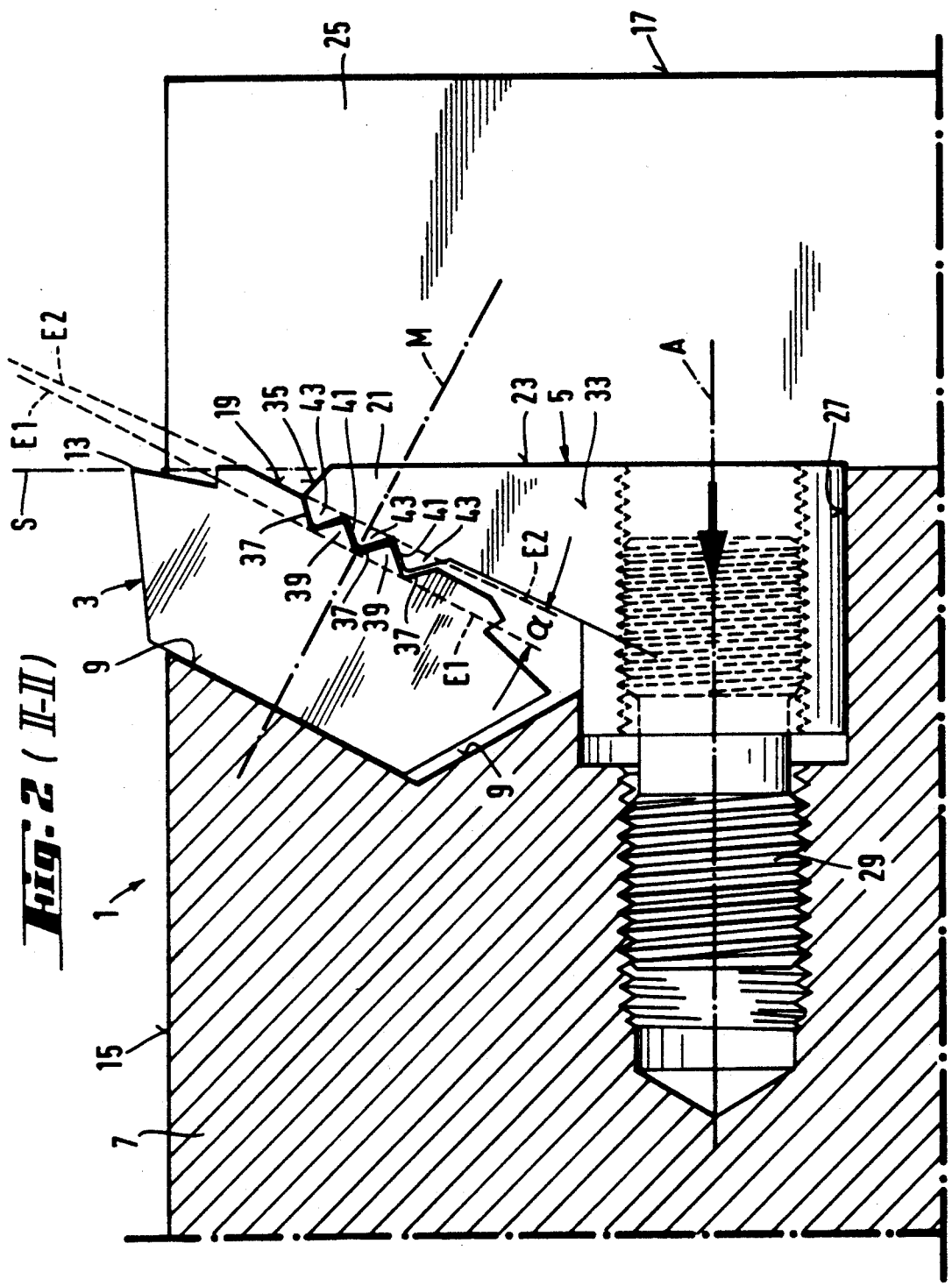
Fig. 2 (II-II)

CUTTING TOOL

BACKGROUND OF THE INVENTION

1. Field of the Invention

The present invention relates to a cutting tool for expanding or opening the diameter of boreholes. The cutting tool includes at least one reversible knife plate having a front surface. The knife plate can be clamped by means of at least one clamping shoe into a recess provided in a cutter head.

2. Description of the Related Art

Cutting tools of the above-described type are known in the art and are used for working on the wall surfaces of boreholes. In operation, the rotating cutting tool is inserted into a borehole and the cutting edge of the knife plate clamped into the cutter head removes chips from the borehole wall. Although the knife plate is clamped into a recess of the cutter head, the high forces occurring during operation may lead to a change of the position of the knife plate relative to the wall of the borehole. This change results in a change of the dimension being cut by the tool or of the adjusted cutting geometry of the tool, so that the bore being worked on no longer corresponds to the desired requirements. If the knife plate is turned or tilted and completely pivoted out of the recess in the cutter head, the tool, as well as the work piece being worked on, can be completely destroyed and persons standing nearby may even be in danger.

SUMMARY OF THE INVENTION

Therefore, it is the object of the present invention to provide a cutting tool of the above-described type in which a positionally secure clamping of the knife plate within the cutter head is ensured, and wherein a particularly turning or tilting of the cutting edge relative to the clamping shoe is practically completely eliminated even when the knife plate has very small dimensions.

In accordance with the present invention, in a cutting tool of the above-described type for expanding or opening the dimension of boreholes, the object is met by providing on the front surface of the knife plate at least two grooves which extend essentially parallel and preferably symmetrical with respect to the longitudinal axis of the knife plate. The grooves cooperate with projections provided on the contact surface of the clamping shoe facing the front surface of the knife plate, and form a positively locked connection therewith.

Accordingly, since the present invention provides that at least two grooves are provided on the front surface of the knife plate which extend essentially parallel to the longitudinal axis of the knife plate, preferably symmetrical with respect to the longitudinal axis and form a positively engaging connection between the knife plate and the corresponding clamping shoe, it is possible to eliminate, with a high degree of safety, any rotation or tilting movement of the knife plate relative to the clamping shoe, so that damage to tool and workpiece and danger to persons are reduced to a minimum.

In accordance with a preferred feature of the cutting tool according to the present invention, the grooves and/or the projections have sides which form a V-shape, i.e., define an angle relative to each other. As a result, the clamping shoe is capable of absorbing forces which have the tendency to press the knife plate further into the recess or to pull the knife plate out of the recess. In particular, this feature prevents, in a particularly effective manner, any tilting movement or any turning movement of the knife plate.

In accordance with a particularly preferred feature, the knife plate of the cutting tool is mounted so as to be displaceable in direction of its longitudinal axis within the corresponding recess, and the grooves of the knife plate and the projections of the clamping shoe extend in the direction of the displacement, i.e., parallel to the longitudinal axis of the knife plate. As a result, the grooves and projections which engage each other serve as a guide means during the displacement of the knife plate. Thus, the displacement or adjustment of the knife plate can take place within a wide range without significantly increasing the danger of a turning or tilting movement of the knife plate.

Another preferred feature of the present invention provides that the front surface of the knife plate provided with the groove and the contact surface of the clamping shoe, provided with the projections, include an acute angle which opens from the end of the clamping lip of the clamping shoe in a direction toward the tightening screw of the clamping shoe. As a result, the frontmost end of the clamping lip of the clamping shoe imparts a particularly high clamping force on the knife plate, so that the forces introduced into the freely projecting portion of the knife plate are absorbed in a particularly efficient manner.

Finally, another preferred feature of the cutting tool according to the present invention provides that the knife plate is reversible. In a reversible knife plate of this type, two cutting edges can be provided which are arranged opposite each other and extend preferably along the longitudinal edges of the plates. After one cutting edge has been worn out, the knife plate can be turned by 180° and used again. In order to obtain the identical locked engagement in both positions, the grooves in the front surface of the knife plate are arranged in pairs symmetrical with respect to the center axis of the knife plate, wherein these grooves interact with the projections provided on the contact surface of the clamping shoe, so that the grooves and projection form a locking engagement.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 1 is a perspective partial view of the front end of a cutting tool according to the present invention; and FIG. 2 is a schematic sectional view of a knife plate clamped by a clamping shoe taken along sectional line II—II of FIG. 1.

DESCRIPTION OF THE PREFERRED EMBODIMENT

The perspective partial view of FIG. 1 of the drawing shows the head of a cutting tool 1 with a knife plate 3 which is clamped by means of a clamping shoe 5. The knife plate is essentially rectangular and its longitudinal edges, as shown in FIG. 1, extend horizontally and, thus, essentially perpendicularly to the axis 11 of rotation of the tool.

The knife plate 3 is mounted in a recess 9 provided in the cutter head 7. The longitudinal axis of the recess 9 extends in radial direction of the center axis or axis of rotation 11 of the tool.

When a borehole is to be expanded the tool is rotated as indicated in FIG. 1 by an arrow, and is moved into the borehole. It is also possible that the tool is stationary and the workpiece is rotated.

The perspective view of FIG. 1 shows that the cutting edge 13 of the knife plate 3 projects beyond the end face 15 of the cutting tool 1. It is also shown in FIG. 1 that the knife plate 3 projects in radial direction beyond the side surface 17 of the essentially cylindrically constructed cutter head 7.

The clamping shoe 5 has a clamping lip 21 which, seen in direction of rotation, is mounted on the front side of the knife plate 3 or on the front surface 19 of the knife plate 3, as shown in FIG. 2. The surface 23 of the clamping shoe 5 facing away from the front surface 19 of the knife plate 3 preferably extends flush with a boundary surface of the chip space 25. For this purpose, the clamping shoe 5 is mounted flush in a recess 27 provided in the cutter head 7, wherein the contours of the recess 17 are adapted to the outer shape of the clamping shoe 5 in such a way that the clamping shoe 5 is held in a form-locking manner in the cutter head 7. The clamping shoe 5 is fastened by means of a tightening screw 29 which extends through the clamping shoe 5 and engages in a thread provided in the cutter head 7.

The clamping shoe 5 is illustrated in FIG. 1 in an elevational view, so that it can be seen that the side edges 31 and 33 of the clamping lip 21, an acute angle which opens from the tightening screw 29 toward the front side 35 of the clamping lip 21. The rear side of the clamping shoe 5 located opposite the front side 35 of the clamping lip 21 is circular arc-shaped, wherein the radius of curvature of this portion of the clamping shoe is selected somewhat smaller than the corresponding, also circular arc-shaped curved portion of the recess 27. FIG. 1 additionally shows that the right side edge 31 of the clamping shoe as seen in FIG. 1 extends essentially parallel to the axis of rotation 11 of the cutting tool 1.

The chip space 25 is formed by a circular sector-shaped recess in the cutter head 7.

FIG. 2 shows, in a side view on a much larger scale, a knife plate 3 and a corresponding clamping shoe 5. For clarity's sake the remaining components of the cutting tool are either shown partially or are omitted entirely. Only the end face 15 of the cutter head 7, beyond which the knife plate projects to a small extent, is indicated by a line S. The knife plate 3 and the clamping shoe 5 are illustrated in FIG. 2 in the assembled position corresponding to FIG. 1.

The knife plate 3 has on its front surface 19 at least two grooves 37 with projections 39 between the grooves 37. In the illustrated embodiment, three grooves 37 are provided. Each groove 37 has two side surfaces which together form a Z-shape with an angle of about 90° being defined between the side surfaces. The angle included between the side surfaces may be selected from a wide range and may be, for example, 140° to 40°, preferably 120° to 70°. The side surfaces of the projections 38 are formed by the side surfaces of the adjacent grooves.

In FIG. 2, a broken line E1 is drawn through the innermost points of the grooves 37. The line E1 forms an imaginary plane of contact of the knife plate 3.

The contact surface of the clamping lip 21 of the clamping shoe 5 which faces the knife plate 3 is also provided with grooves 41 and projections 43 between the grooves 41. The side surfaces of the grooves 41 are also arranged so as to form a V-shape and include an angle of about 90°. The angle included between the side surfaces of the projections 43 is in the same range as the ranges discussed above with respect to the grooves 37 provided in the knife plate 3. The side surfaces of adjacent grooves 41 form the side surfaces of the projections 43 between the rows.

As is apparent from the above, the projections 39 on the front surface 19 of the knife plate 3, as well as the projections 43 on the contact surface of the clamping lip 21 are also essentially V-shaped as seen in the side view. However, it is also possible to have projections which are rounded or flattened at the apex thereof, so that, seen in cross-section, they are essentially trapezoidally shaped.

An imaginary contact plane E2 of the clamping lip 21 extends through the innermost points of the grooves 41. The plane E2 is illustrated in a broken line.

The two planes E1 and E2 preferably include an acute angle $\alpha$ which, as seen in FIG. 2, opens from the front side 35 of the clamping lip 21 toward the clamping screw 29. This configuration provides the result that the clamping lip 21 is initially placed with the front side 25 thereof against the front surface 19 of the knife plate 3, and is finally fully pressed against the front surface 19 when the clamping shoe 5 is tightened.

As can be seen in FIG. 2, the contact plane E1 is inclined relative to the vertical S in FIG. 2 and thus, relative to the axis of rotation 11 of the cutting tool 1 illustrated in FIG. 1. Consequently, in the assembled state, the clamping shoe 5 can be mounted flush with the surface which defines the chip space 25, so that the surface 23 of the clamping shoe is mounted flush or almost flush with the surface defining the chip space. As a result, the chip removal is impaired only to a minimal extent. Especially in the case of small tool diameters, the chip removal is not impaired.

As FIG. 2 further shows, the grooves 37 and 41 and the projections 39 and 43 are arranged essentially symmetrical with respect to the longitudinal axis of the knife plate 3.

In the illustrated embodiment of the cutting tool 1, the knife plate 3 is arranged in an inclined position. In other words, the parallel front and rear surfaces of the knife plate and the center plane thereof, extend at an angle relative to the center axis or axis of rotation of the tool. This makes it possible to mount the clamping shoe in a flush manner.

The knife plate 3 of the illustrated cutting tool is a so-called reversible plate, wherein the oppositely located longitudinal edges both are cutting edges. Thus, when the upper cutting edge in FIG. 2 has become dull, the knife plate 3 can be turned by 180° about its center axis M which extends perpendicularly to the front surface 19, so that the lower cutting edge in FIG. 2 then replaces the upper cutting edge.

If the desired locking engagement between the knife plate and the clamping shoe is to be maintained, this turning of the knife plate is only possible if the grooves 37 and the projections 39 between the grooves 37 are arranged symmetrically with respect to the longitudinal axis of the knife plate 3. The projections on the contact surface of the clamping lip 21 facing the front surface 18 of the knife plate 3 are also arranged symmetrically in the same manner as the grooves 37 and projections 39 of the knife plate 3.

However, it is also possible to have the side surfaces of the grooves and projections arranged in such a way that they do not extend symmetrically relative to a line extending perpendicularly to the contact planes E1 and E2. However, in this case, the knife plate cannot be a reversible plate.

As mentioned above, the inclination of the side surfaces of the grooves 37 and 41, and of the projections 39 and 43 can be selected freely within a wide range. It is merely important that the configuration of the grooves 37 and projections 39 of the knife plate 3 corresponds to the configuration of the grooves 41, and projections 43 on the contact surface of the clamping lip 21, so that an exact positive engagement results between the front surface 19 of the knife plate and the clamping lip 21. Always two side surfaces defining a groove interact with the two side surfaces of the projection which engages into the groove.

The distance of the outer cutting edge from the center axis or axis of rotation of the tool is determined by the arrangement of the groove and projections on the knife plate and on the clamping shoe. Therefore, it is possible to provide different clamping shoes which differ from each other in that the distances of the groove and projections on the clamping shoe measured from the axis A or from the front side 35 are different. When such different clamping shoes are used, the distance of the outer cutting edge of the knife plate from the axis of rotation of the tool can be selected as desired. Thus, if contrary to FIG. 1 the knife plate does not extend perpendicularly to the axis of rotation of the tool, but essentially parallel thereto, different tool diameters can be selected by providing different distances of the active outer cutting edge of the knife plate from the axis of rotation of the tool. As a result, it is possible, for example, to stagger the various distances by using different clamping shoes by 5 μm; in other words, the diameters of the bores to be worked on can be varied in 5 μm steps. By appropriately staggering the distances of the grooves or projections, other steps of the diameter of the borehole can be provided. As a result, the adjustment of the tool relative to the predetermined borehole diameter is substantially simplified. A fine adjustment is no longer necessary, particularly if the steps of the distances of the grooves and projections on the clamping shoe are sufficiently finely selected.

The side view of FIG. 2 shows the arrangement of the tightening screw 29 within the clamping shoe 5. As can be seen in FIG. 2, the tightening screw 29 meshes with an external thread in an internal thread which is provided in a bore extending through the clamping shoe 5. The center axis A of the tightening screw extends essentially perpendicularly of the vertical line S shown in FIG. 2 which extends in the surface defining the chip space 25.

The knife plate 3 may be mounted so as to be displaceable within the recess 9. In other words, the extent by which the knife plate 3 projects in radial direction beyond the side surface 17 of the cutter head 7 is adjustable. If this type of adjustability of knife plate is desired, it is an advantage if the grooves of the front surface 19 of the knife plate and on the contact surface of the clamping lid 21 are constructed continuously because the radial displacement of the knife plate to the outside and to the inside is not impaired. Moreover, it must be ensured that the grooves and projections extend in the direction of the device used for displacement. The locking engagement between the front surface of the knife plate and the contact surface of the clamping lip results in a guidance of the knife plate when the knife plate is moved radially. It is possible to provide suitable adjusting devices, for example, adjusting screws, in the cutter head 7 which push the knife plate outwardly in radial direction. However, for clarity's sake, these adjusting screws are not illustrated in the drawing.

The operation of the cutting tool of the present invention is described as follows:

In order to work on the surfaces of boreholes, the cutting tool is rotated and introduced into the borehole. The front cutting edge 13 of the knife plate 3 removes chips from the borehole wall. In addition to the horizontal cutting edge of the knife plate as shown in FIG. 2, chips can also be removed from the borehole wall by at least a portion of the radially outer edge of the knife plate 3 which, as seen in FIG. 1, extends approximately vertically and, thus, approximately parallel to the axis of rotation of the tool. The chip removal results in forces acting on the knife plate 3 which, on the one hand, push the knife plate 3, as seen in FIG. 1, against the rear wall of the recess 9 receiving the knife plate. On the other hand, forces directed from the top toward the bottom and parallel to the axis of rotation 11 act on the outer edge of the knife plate 3, so that a tilting or turning movement of the knife plate could occur. However, this tilting or turning movement is prevented by the grooves and projections on the front surface 19 of the knife plate and of the contact surface of the clamping lip 21.

Accordingly, the configuration of the front surface of the knife plate and of the clamping lip results in a locking engagement which prevents rotation and ensures a positionally secure clamping of the knife plate. The side surfaces of the grooves and projections interact in such a way that the left portion of the clamping shoe 5 as seen in FIG. 1 absorbs downwardly directed forces which have the tendency to press the knife plate further into the corresponding recess 9. On the other hand, on the oppositely located, radially inner side of the clamping shoe 5 the forces acting in feeding direction of the tool, i.e., upwardly in FIG. 1, are absorbed by the side surfaces of the grooves and projections. Thus, it is a particular advantage that the locking engagement absorbs forces which have the tendency to press the knife plate 3 into the groove 9, on the one hand, and to pull the knife plate 3 out of the recess 9, on the other hand.

The stable mounting of the knife plate 3 is ensured because the clamping shoe 5 is arranged in the recess 27 in the cutter head 7 and, thus, is secured against a pivoting movement about the tightening screw 29. Since the edge 31 of the clamping lip 21, as seen in FIG. 1, extends practically parallel to the axis of rotation 11, the knife plate is exactly secured at the radially innermost point. This results in a particularly long lever arm in anchoring the knife plate and in absorbing the forces which act in feeding direction of the tool when working on a borehole.

The knife plate 3 is securely anchored in the cutter head 7 even if the knife plate is displaced radially outward. This is because of guiding properties of the grooves 37 and 41 and the projections 39 and 43.

Because of the fact that the contact planes E1 and E2 include an acute angle of 1° to 10°, preferably of 1° to 3°, which opens against the feeding direction of the tool, when the knife plate 3 is being clamped, the clamping lip 21 initially rests against that portion which is closest to the active cutting edge 13. When the clamping shoe 5 is tightened, the clamping lip 21 is slightly deformed, so that the grooves and projections which are located further below, as seen in FIG. 1, begin to engage the corresponding grooves and projections on the front surface 19 of the knife plate. As a result, a very high clamping force is introduced near the cutting edge 13 into the knife plate which, as a result, is pressed against and securely clamped against the wall of the recess 9 located opposite the clamping lip.

Since the forces occurring during the working on a borehole wall are absorbed in an optimum manner by the locking engagement described above, an abutment for the knife plate at the bottom of the recess 9 is unnecessary. This means that the knife plate 3 can easily be constructed as a reversing plate. When the knife plate is clamped, the non-active cutting edge of the knife plate, located opposite the cutting edge 13, cannot be damaged.

The number of grooves and projections can be reduced to two grooves or projections. This means that the locking engagement provided by the invention can be used even in very small knife plates or in tools having very small diameters. Even in this case, the knife plate is securely mounted even if the knife plate is displaced radially outwardly by a significant extent, so that the radial outer edge of the knife plate projects far beyond the side surface 17 of the cutter head 7.

As is apparent from the above, the knife plate, together with the clamping shoe, can also be arranged so as to be turned by 90°, so that the outer cutting edge of the knife plate then extends essentially parallel to the axis of rotation of the tool. However, in this case, the knife plate can no longer be adjusted in radial direction. An adjustment of the tool to a desired diameter can be carried out, as described above, by the appropriate selection of suitable clamping shoes. In this case, the knife plate can otherwise only be displaced in direction of the axis of rotation, wherein a guidance in this direction is provided by the locking engagement of the grooves and projections.

While a specific embodiment of the invention has been shown and described in detail to illustrate the application of the inventive principle, it will be understood that the invention may be embodied otherwise without departing from such principles.

We claim:

1. A cutting tool for expanding boreholes, comprising:
    a cutter head;
    at least one knife plate having a front surface and a longitudinal axis;
    at least one clamping shoe for clamping the knife plate into a recess provided in the cutter head;
    at least two grooves on the front surface of the knife plate, wherein said grooves extend essentially parallel with respect to the longitudinal axis of the knife plate;
    a contact surface on said clamping shoe, wherein said surface faces the front surface of the knife plate; and
    projections on the contact surface of the clamping shoe engaging in the grooves of the front surface of the knife plate forming a positively locked connection between the knife plate and the clamping shoe.

2. The cutting tool of claim 1, wherein the knife plate is reversible.

3. The cutting tool of claim 2, wherein the grooves and projections are arranged symmetrically relative to the longitudinal axis of the knife plate.

4. The cutting tool of claim 1, wherein the grooves and projections comprise side surfaces which form a V-shape therebetween.

5. The cutting tool of claim 4, wherein the side surfaces include an angle of 140° to 40°.

6. The cutting tool of claim 4, wherein the side surfaces include an angle of 120° to 70°.

7. The cutting tool of claim 4, wherein the side surfaces include an angle of 90°.

8. The cutting tool of claim 1, wherein the grooves extend continuously over the entire front surface of the knife plate and the projections extend continuously over the entire width of the contact surface of the clamping shoe.

9. The cutting tool of claim 1, wherein the grooves extend continuously over the entire contact surface of the knife plate.

10. The cutting tool of claim 1, wherein the projections extend continuously over the entire width of the contact surface of the clamping shoe.

11. The cutting tool of claim 1, wherein the knife plate is mounted in the recess of the cutter head to be displaceable in radial direction.

12. The cutting tool of claim 1, wherein the grooves and projections are arranged parallel relative to a direction of adjustment of the knife plates.

13. The cutting tool of claim 1, further comprising:
    a clamping lip on the clamping shoe provided with the projections;
    a tightening screw extending through the clamping shoe;
    innermost points on the grooves; and valleys between the projections having innermost points, wherein a plane extending through the innermost points of the grooves includes an acute angle with a plane extending through the innermost points of the valleys, the acute angle opening from an end of the clamping lip of the clamping shoe toward the tightening screw.

14. The cutting tool of claim 13, wherein the acute angle is 1° to 10°.

15. The cutting tool of claim 13, wherein the acute angle is approximately 1° to 3°.

16. In a cutting tool for expanding boreholes, the cutting tool including a cutter head, at least one knife plate having a front surface and a longitudinal axis, and at least one clamping shoe for clamping the knife plate into a recess provided in the cutter head, the improvement comprising the front surface of the knife plate having at least two grooves which extend essentially parallel with respect to the longitudinal axis of the knife plate, the at least one clamping shoe having a contact surface facing the front surface of the knife plate, the contact surface of the clamping shoe having projections, wherein the projections of the contact surface of the clamping shoe engage in the grooves of the front surface of the knife plate, whereby a positively locked connection between the knife plate and the clamping shoe is formed, clamping shoe includes a clamping lip which is provided with the projections, and a tightening screw extending through the clamping shoe, the grooves having innermost points, the projections having valleys therebetween, the valleys having innermost points, wherein a plane extending through the innermost points of the grooves includes an acute angle with a plane extending through the innermost points of the valleys, the acute angle opening from an end of the clamping lip of the clamping shoe toward the tightening screw.

17. The cutting tool according to claim 16, wherein the acute angle is 1° to 10°.

18. The cutting tool according to claim 16, wherein the acute angle is 1° to 3°.

* * * * *